United States Patent
Borrell

(10) Patent No.: US 9,482,185 B1
(45) Date of Patent: Nov. 1, 2016

(54) THERMAL ROCKET INITIATOR MECHANISM AND ROCKET SYSTEM INCORPORATING SAME

(71) Applicant: Frederick J Borrell, Indian Head, MD (US)

(72) Inventor: Frederick J Borrell, Indian Head, MD (US)

(73) Assignee: The United States of America as Reprented by the Secretary of the Navy, Washington, DC (US)

( * ) Notice: Subject to any disclaimer, the term of this patent is extended or adjusted under 35 U.S.C. 154(b) by 170 days.

(21) Appl. No.: 13/999,384

(22) Filed: Feb. 20, 2014

(51) Int. Cl.
*F42C 15/31* (2006.01)
*F02K 9/95* (2006.01)

(52) U.S. Cl.
CPC ..... *F02K 9/95* (2013.01); *F42C 15/31* (2013.01)

(58) Field of Classification Search
CPC .......... F42B 39/14; F02K 9/38; F02K 9/566; F02K 9/95; F42C 15/31
USPC ...................... 102/481, 202.1, 221, 222, 380; 89/1.812; 60/223, 254, 256
See application file for complete search history.

(56) References Cited

U.S. PATENT DOCUMENTS

| | | | |
|---|---|---|---|
| 4,047,484 A * | 9/1977 | Cole | F42C 15/184 102/256 |
| 4,793,257 A * | 12/1988 | Bolieau | F42C 15/40 102/221 |
| 4,961,313 A | 10/1990 | Dolan | |
| 5,044,154 A | 9/1991 | English, Jr. et al. | |
| 5,390,487 A * | 2/1995 | Moore | F42C 15/34 102/222 |
| 5,445,077 A * | 8/1995 | Dupuy | F42C 15/36 102/481 |
| 6,360,526 B2 | 3/2002 | Kunstmann | |
| 6,619,029 B2 | 9/2003 | Solberg et al. | |
| 6,966,264 B2 | 11/2005 | Solberg et al. | |
| 7,051,511 B2 * | 5/2006 | Prytz | F42B 39/20 102/377 |
| 7,762,195 B2 | 7/2010 | Friedlander, III et al. | |
| 8,191,351 B2 | 6/2012 | Loehr et al. | |
| 8,356,727 B2 * | 1/2013 | Traxler | F42B 39/20 220/202 |

\* cited by examiner

*Primary Examiner* — Benjamin P Lee
(74) *Attorney, Agent, or Firm* — Fredric J. Zimmerman

(57) ABSTRACT

A thermal rocket initiator mechanism, including a housing; a primer carriage translatable within the housing; a percussion primer disposed within the primer carriage; and a pair of actuator rods disposed within the housing where one of the pair of actuator rods is coupled to the primer carriage and the other pair of actuator rods is coupled to the housing. The mechanism further includes a rocker arm coupling the pair of actuator rods to one another where the pair of actuator rods are manufactured from a shape memory alloy that changes dimensions upon heating, translating the primer carriage within the housing and correspondingly actuating the percussion primer. The pair of actuator rods includes a long actuator rod and a short actuator rod. The percussion primer is actuated through a ramp structure coupled to the primer carriage and a spring structure coupled to the housing.

20 Claims, 2 Drawing Sheets

THERMAL ROCKET INITIATOR MECHANISM AND ROCKET SYSTEM INCORPORATING SAME

STATEMENT OF GOVERNMENT INTEREST

The present invention described herein may be manufactured and used by or for the Government of the United States of America for governmental purposes without the payment of any royalties thereon or therefore.

FIELD OF THE DISCLOSURE

The present disclosure relates generally to weapons systems and methods, and more specifically rocket systems and methods. More particularly, the present disclosure relates to a thermal rocket initiator mechanism (TRIM) that preemptively ignites a rocket motor undergoing slow heating before the propellant can auto-ignite, resulting in the propellant burning as designed instead of exploding.

BACKGROUND OF THE DISCLOSURE

When a rocket motor undergoes slow heating (i.e., slow cook-off), such as in a fire onboard a naval vessel or the like, the propellant is gradually energized from the outer case wall inward. Slow cook-off is defined as ambient air temperature rising at about 6 degrees F. per hour. Heating proceeds until the propellant near the case wall auto-ignites. Problematically, when the propellant near the case wall auto-ignites, a high-pressure gas bubble generated inside the case wall collapses the propellant grain, blocking the associated nozzle and any vents, causing the pressure within the rocket motor to increase, and resulting in the explosion of the rocket, which is likely still housed in the related storage/launch assembly.

Therefore, it is desirable that a TRIM be provided that preemptively ignites a rocket motor undergoing slow heating before the propellant can auto-ignite, resulting in the propellant burning as designed, along the proper burning interfaces, instead of exploding. This mode of operation keeps the propellant grain intact and the venting channels open. If the rocket chamber is robust enough to contain the increase in pressure that results from burning the propellant at elevated temperature, then no further changes to conventional rocket systems would be necessary. If the rocket chamber is not robust enough to contain the increase in pressure that results from burning the propellant at elevated temperature, then larger venting channels or a stronger rocket chamber would be necessary. In any case, a controlled burn of a stored rocket is desirable as compared to an uncontrolled explosion of a stored rocket.

Several TRIMs based on a Nickel titanium (NiTiNOL) shape memory alloy (SMA) have been built to demonstrate SMA technology in the past. Such SMAs recover their unstrained shape when heated above a transition temperature. All have been unsuitable for application in a service environment. The first holds a percussion primer in line with an igniter passage, which is problematic in all but testing applications because in an operational application the accidental ignition of the percussion primer would fire the rocket motor. The second holds a percussion primer out of line from an igniter passage, but does not isolate the percussion primer from the environment. This structure, and related situation, could lead to injury if a person were handling the rocket. Thus, neither demonstration TRIM is acceptable for use in operational ordnance. A refined solution is still required.

BRIEF SUMMARY OF THE DISCLOSURE

In various exemplary embodiments, the present disclosure provides a TRIM that preemptively ignites a rocket motor undergoing slow heating before the propellant can auto-ignite, resulting in the propellant burning as designed, along the proper burning interfaces, instead of exploding. This mode of operation keeps the propellant grain intact and the venting channels open. The TRIM utilizes a NiTiNOL SMA with a safety interlock mechanism that ensures rocket user/handler safety to the greatest extent possible.

In one exemplary embodiment, the present disclosure provides a thermal rocket initiator mechanism, including: a housing; a primer carriage translatable within the housing; a percussion primer disposed within the primer carriage; and a pair of actuator rods disposed within the housing, where one of the pair of actuator rods is coupled to the primer carriage and the other pair of actuator rods is coupled to the housing. The present disclosure also includes a rocker arm coupling the pair of actuator rods to one another where the pair of actuator rods are manufactured from a shape memory alloy that changes dimensions upon heating, thereby translating the primer carriage within the housing and correspondingly actuating the percussion primer. The pair of actuator rods includes one actuator rod that is relatively longer and one actuator rod that is relatively shorter. Optionally, the shape memory alloy is NiTiNOL. The percussion primer is actuated through a ramp structure coupled to the primer carriage and a spring structure coupled to the housing. The spring structure actuates a detent ball disposed adjacent to the percussion primer. The thermal rocket initiator mechanism also includes a safety interlock mechanism actuated by an actuation material, such as wax or the like, disposed in a cavity adjacent to the percussion primer. The percussion primer, when actuated, actuates, a rocket motor igniter.

In another exemplary embodiment, the present disclosure provides a method for providing a thermal rocket initiator mechanism, including: providing a housing; providing a primer carriage translatable within the housing; providing a percussion primer disposed within the primer carriage; and providing a pair of actuator rods disposed within the housing, wherein one of the pair of actuator rods is coupled to the primer carriage and the other of the pair of actuator rods is coupled to the housing. The method also includes providing a rocker arm coupling the pair of actuator rods to one another where the pair of actuator rods are manufactured from a shape memory alloy that changes dimensions upon heating, thereby translating the primer carriage within the housing and correspondingly actuating the percussion primer. The pair of actuator rods includes one actuator rod that is relatively longer and one actuator rod that is relatively shorter. Optionally, the shape memory alloy includes NiTiNOL. The percussion primer is actuated through a ramp structure coupled to the primer carriage and a spring structure coupled to the housing. The spring structure actuates a detent ball disposed adjacent to the percussion primer. The method for providing a thermal rocket initiator mechanism also includes providing a safety interlock mechanism actuated by an actuation material, such as wax or the like, disposed in a cavity adjacent to the percussion primer. The percussion primer, when actuated, actuates, a rocket motor igniter.

In a further exemplary embodiment, the present disclosure provides a rocket system, including: a thermal rocket initiator mechanism, including: a housing; a primer carriage translatable within the housing; a percussion primer disposed within the primer carriage; a pair of actuator rods disposed within the housing where one of the pair of actuator rods is coupled to the primer carriage and the other pair of actuator rods is coupled to the housing; and a rocker arm coupling the pair of actuator rods to one another where the pair of actuator rods are manufactured from a shape memory alloy that changes dimensions upon heating, thereby translating the primer carriage within the housing and correspondingly actuating the percussion primer. The rocket system also includes a rocket motor igniter correspondingly actuated by the percussion primer of the thermal rocket initiator mechanism. The pair of actuator rods includes one actuator rod that is relatively longer and one actuator rod that is relatively shorter. Optionally, the shape memory alloy is NiTiNOL. The percussion primer is actuated through a ramp structure coupled to the primer carriage and a spring structure coupled to the housing. The spring structure actuates a detent ball disposed adjacent to the percussion primer. The thermal rocket initiator mechanism also includes a safety interlock mechanism actuated by an actuation material, such as wax or the like, disposed in a cavity adjacent to the percussion primer.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, the present disclosure provides a TRIM that preemptively ignites a rocket motor undergoing slow heating before the propellant can auto-ignite, resulting in the propellant burning as designed, along the proper burning interfaces, instead of exploding. This mode of operation keeps the propellant grain intact and the venting channels open. The TRIM utilizes a NiTiNOL SMA with a safety interlock mechanism that ensures rocket user/handler safety to the greatest extent possible.

Figure 1:
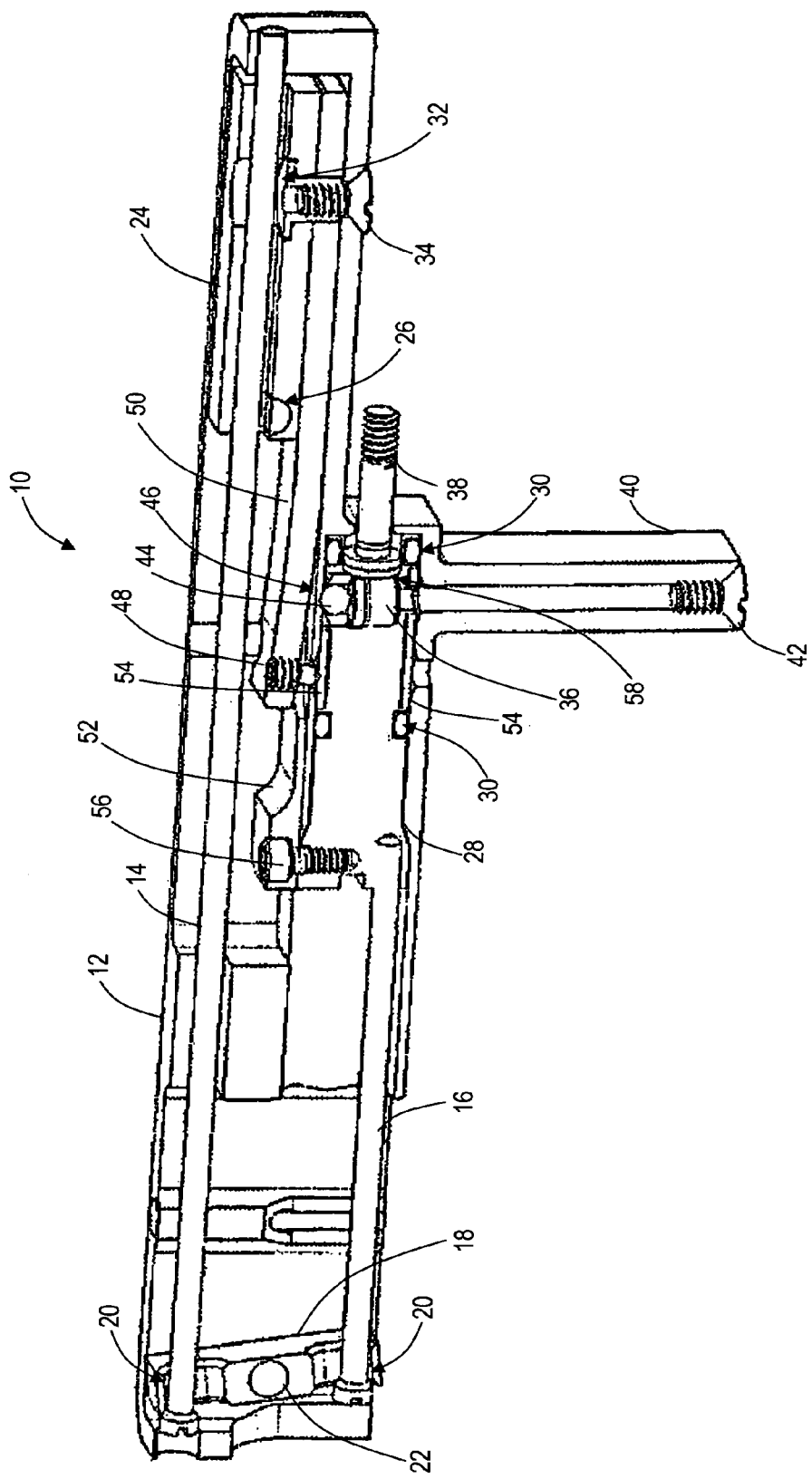
FIG. 1 is a transparent perspective view illustrating one exemplary embodiment of the TRIM of the present disclosure in a safe configuration.

Referring to FIG. 1, illustrating one exemplary embodiment of the TRIM 10 of the present disclosure in a safe configuration, the TRIM 10 includes a housing 12 that is integrated with the conventional onboard firing device of a rocket motor. The TRIM 10 is positioned external to the rocket motor chamber astride the igniter body, such that the output port of the TRIM 10 is aligned with a passage in the igniter, which passage is isolated from other internal passages of the igniter. The housing has an overall length on the order of about 6 inches and an overall width/diameter on the order of about 1.75 inches, and, in an exemplary embodiment, is manufactured from steel or the like. Two NiTiNOL actuator rods are disposed within the housing, including a long NiTiNOL actuator rod 14 having an overall length of between about 5 inches and about 6 inches and an overall thickness of between about 0.075 inches and about 0.125 inches and a short NiTiNOL actuator rod 16 having an overall length of between about 2 inches and about 3 inches and an overall thickness of between about 0.075 inches and about 0.125 inches. The actuator rods 14 and 16 are each coupled to a rocker arm 18 or the like at one end by a pivot head 20 or the like. The rocker arm 18 is coupled to the housing 12 by a fulcrum pin 22 or the like. Collectively, the rocker arm 18, the pivot heads 20, and the fulcrum pin 22 allow relatively free movement of the ends of the actuator rods 14 and 16, and provide a mechanism for transferring the movement of one actuator rod 14 to the other actuator rod 16, such as when the actuator rods 14 and 16 change dimensions. The opposite end of the long actuator rod 14 is coupled to the housing 12 by an adjustment screw thread. A spring clamp plate 24 includes a dowel pin 26. The opposite end of the short actuator rod 16 is coupled to a primer carriage 28 secured within the housing 12 by a detent ball safety interlock and including a pair of o-ring seals 30. The spring clamp plate 24 and a corresponding firing spring assembly 50 are secured within the housing 12 by a rivet nut 32 and spring assembly anchor screw 34 including the dowel pin 26.

The percussion primer 36 and primer carriage detent piston 38 are disposed at the end of the primer carriage 28, and a primer safety reservoir 40 including a primer safety reservoir plug screw 42 are disposed adjacent to the percussion primer 36. In general, the percussion primer 36 and associated firing mechanism act as they do in conventional weapons systems. The percussion primer 36 is acted upon by a primer carriage detent ball 44 disposed within a primer carriage detent ball retainer 46, which is acted upon by a firing pin 48. The firing pin 48 is coupled to the firing spring assembly 50. In this case, the firing mechanism is cocked and actuated by translation of the primer carriage 28 dictated by dimensional changes associated with the actuator rods 14 and 16.

A ramp plate 52 and carriage seal pads 54 are disposed adjacent to the primer carriage 28, with the ramp plate 52 secured to the primer carriage 28 by a ramp plate retainer screw 56.

Figure 2:
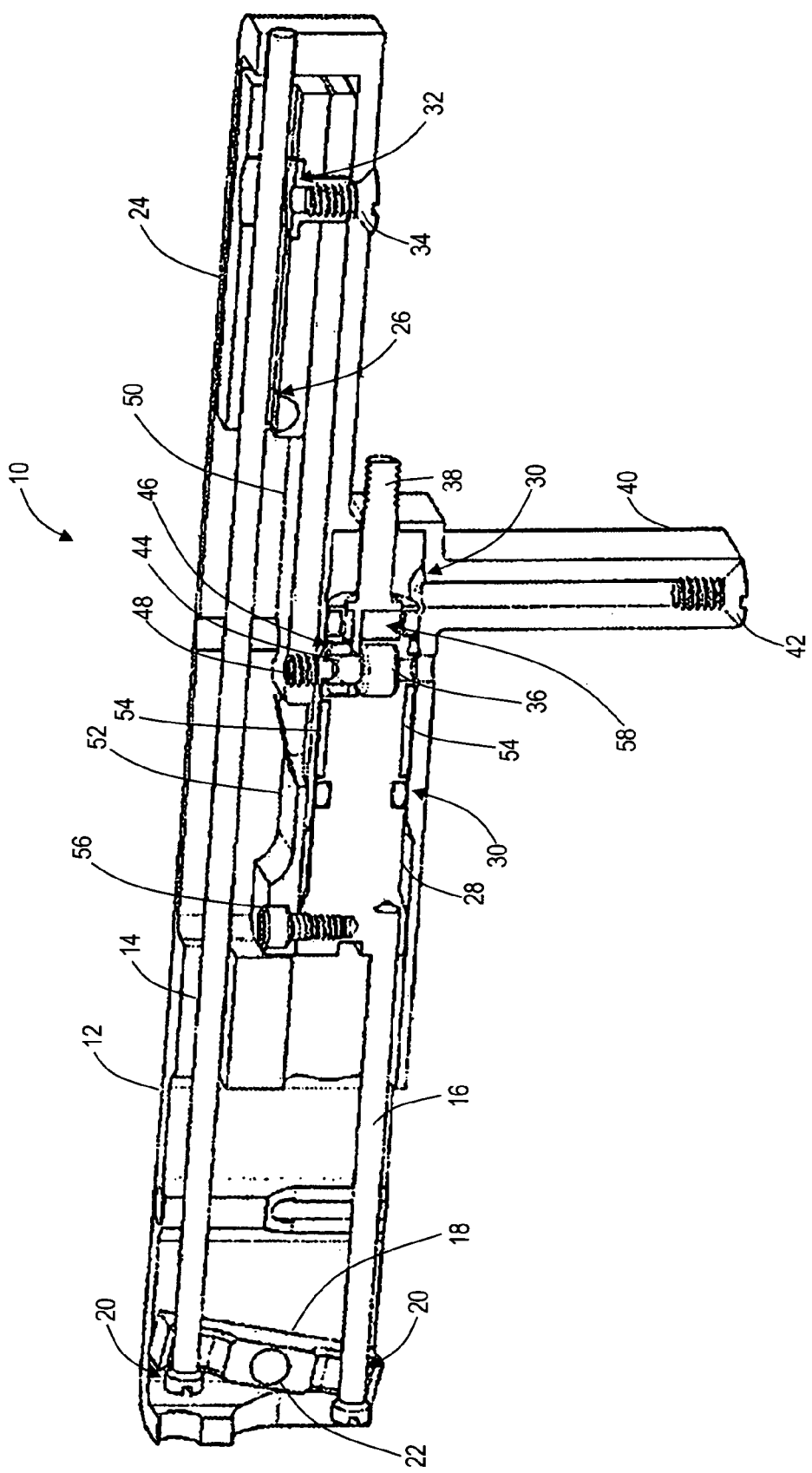
FIG. 2 is a transparent perspective view illustrating one exemplary embodiment of the TRIM of the present disclosure in a fired configuration.

Finally, and as referring to FIG. 2, piston actuation material 58, such as wax or the like, is disposed within a cavity in one end of the primer carriage 28 and contained by the primer carriage detent piston 38. With the TRIM 10 in the safe configuration, the wax or the like secures the primer detent piston 38 inside the cavity of the primer carriage 28, and correspondingly secures the detent ball safety interlock.

Referring to FIG. 2, illustrating one exemplary embodiment of the TRIM 10 of the present disclosure in a fired configuration, when the TRIM 10 is exposed to heating conditions, the temperature of the actuator rods 14 and 16 increases through a narrow transition temperature range of the NiTiNOL alloy and the actuator rods shorten by as much as 6%, thereby exerting a force large enough to overcome the friction holding the primer carriage 28 in place (due, in part, to the pair of o-ring seals 30 and the carriage seal pads 54). The rocker arm 18 transmits the shortening of the long actuator rod 14 to the short actuator rod 16, thereby moving the primer carriage 28 into firing position while simultaneously cocking and releasing the firing spring assembly 50 along the ramp plate 52. Two ramps on the ramp plate 52 are coupled to two corresponding cam surfaces disposed within the leaf of the firing spring assembly 50. Actuator rods 14 and 16 translate the primer carriage 28 and the ramp plate 52 correspondingly. The two ramps on the ramp plate 52 slide on the two cam surfaces in the firing spring assembly 50, cocking the firing spring assembly 50 until the end of the firing spring assembly 50 disengages from the ends of the ramps and snaps the firing pin 48 into the primer carriage detent ball 44, which fires the percussion primer 36 and correspondingly initiates the rocket motor's stock igniter.

The TRIM 10 of the present disclosure has several advantages over previous developmental preemptive ignition mechanisms. First, the TRIM 10 isolates the percussion primer 36 from the igniter charge and the environment, such that accidental initiation poses no threat to the rocket motor or its payload. Second, the TRIM 10 has a thermally-activated locking detent feature absent in previous developmental preemptive ignition mechanisms. Third, the thermally-activated locking detent feature uses wax or the like for thermal actuation, not SMA, providing two independent actuation environments as required by guidelines promulgated by the Weapon Systems Engineering Safety Review Board (WSESRB), responsible for ensuring the operational safety of all ordnance deployed aboard vessels of the U.S. Navy. Fourth, the TRIM 10 uses thinner actuator rods 14 and 16 than its predecessors (having overall thicknesses of between about 0.075 inches and about 0.125 inches), such that thermal gradients in the actuator rods 14 and 16 are smaller than those of its predecessors, making the transition of the actuator rods 14 and 16 to an unstrained state more uniform and actuation more reliable than with the few preemptive ignition mechanisms that have been built to demonstrate SMA technology in the past.

Although the present disclosure has been illustrated and described herein with reference to exemplary embodiments and specific examples thereof, it will be readily apparent to those of ordinary skill in the art that other exemplary embodiments may perform similar functions and/or achieve like results. All such equivalent embodiments and examples are within the spirit and scope of the present disclosure, are contemplated thereby, and are intended to be covered by the following claims.

Finally, any numerical parameters set forth in this Specification and the attached Claims are approximations (for example, by using the term "about") that may vary depending upon the desired properties sought to be obtained by the present invention. At the very least, and not as an attempt to limit the application of the doctrine of equivalents to the scope of the Claims, each numerical parameter should be construed in light of the number of significant digits and by applying ordinary rounding.

What is claimed is:

1. A thermal rocket initiator mechanism, comprising:
a housing;
a primer carriage being translatable within the housing;
a percussion primer being disposed within the primer carriage;
a pair of actuator rods being disposed within the housing, wherein one of the pair of actuator rods is coupled to the primer carriage and the other of the pair of actuator rods is coupled to the housing; and
a rocker arm coupling the pair of actuator rods to one another,
wherein the pair of actuator rods are manufactured from a shape memory alloy that changes dimensions upon heating to an alloy transition temperature, thereby translate the primer carriage within the housing and correspondingly to actuate the percussion primer.

2. The thermal rocket initiator mechanism of claim 1, wherein the pair of actuator rods comprise one actuator rod that is relatively longer and one actuator rod that is relatively shorter.

3. The thermal rocket initiator mechanism of claim 1, wherein the shape memory alloy comprises NiTiNOL.

4. The thermal rocket initiator mechanism of claim 1, wherein the percussion primer is actuated through a ramp structure coupled to the primer carriage and a spring structure coupled to the housing.

5. The thermal rocket initiator mechanism of claim 4, wherein the spring structure actuates a detent ball disposed adjacent to the percussion primer.

6. The thermal rocket initiator mechanism of claim 1, further comprising a safety interlock mechanism actuated by an actuation material disposed in a cavity adjacent to the percussion primer.

7. The thermal rocket initiator mechanism of claim 1, wherein the percussion primer, when actuated, actuates, a rocket motor igniter.

8. A method for providing a thermal rocket initiator mechanism, comprising:
providing a housing;
providing a primer carriage being translatable within the housing;
providing a percussion primer being disposed within the primer carriage;
providing a pair of actuator rods being disposed within the housing, wherein one of the pair of actuator rods is coupled to the primer carriage and the other of the pair of actuator rods is coupled to the housing; and
providing a rocker arm coupling the pair of actuator rods to one another,
wherein the pair of actuator rods are manufactured from a shape memory alloy that changes dimensions upon heating to an alloy transition temperature, thereby translate the primer carriage within the housing and correspondingly to actuate the percussion primer.

9. The method of claim 8, wherein the pair of actuator rods comprise one actuator rod that is relatively longer and one actuator rod that is relatively shorter.

10. The method of claim 8, wherein the shape memory alloy comprises NiTiNOL.

11. The method of claim 8, wherein the percussion primer is actuated through a ramp structure coupled to the primer carriage and a spring structure coupled to the housing.

12. The method of claim 11, wherein the spring structure actuates a detent ball disposed adjacent to the percussion primer.

13. The method of claim 8, further comprising providing a safety interlock mechanism actuated by an actuation material disposed in a cavity adjacent to the percussion primer.

14. The method for providing a thermal rocket initiator mechanism of claim 8, wherein the percussion primer, when actuated, actuates, a rocket motor igniter.

15. A rocket system, comprising:
a thermal rocket initiator mechanism, comprising:
a housing;
a primer carriage being translatable within the housing;
a percussion primer being disposed within the primer carriage;
a pair of actuator rods being disposed within the housing, wherein one of the pair of actuator rods is coupled to the primer carriage and the other of the pair of actuator rods is coupled to the housing; and
a rocker arm coupling the pair of actuator rods to one another,
wherein the pair of actuator rods are manufactured from a shape memory alloy that changes dimensions upon heating to an alloy transition temperature, thereby translate the primer carriage within the housing and correspondingly to actuate the percussion primer; and a rocket motor igniter being actuated by the percussion primer of the thermal rocket initiator mechanism.

16. The rocket system of claim 15, wherein the pair of actuator rods comprise one actuator rod that is relatively longer and one actuator rod that is relatively shorter.

17. The rocket system of claim 15, wherein the shape memory alloy comprises NiTiNOL.

18. The rocket system of claim 15, wherein the percussion primer is actuated through a ramp structure coupled to the primer carriage and a spring structure coupled to the housing.

19. The rocket system of claim 18, wherein the spring structure actuates a detent ball disposed adjacent to the percussion primer.

20. The rocket system of claim 15, further comprising a safety interlock mechanism actuated by an actuation material disposed in a cavity adjacent to the percussion primer.

* * * * *